United States Patent [19]
Cummins et al.

[11] Patent Number: 5,963,943
[45] Date of Patent: *Oct. 5, 1999

[54] SYSTEM AND METHOD FOR STORING AND RETRIEVING PERFORMANCE AND TOPOLOGY INFORMATION

[75] Inventors: Thomas H. Cummins, Littleton; Christopher D. Fry, Monument, both of Colo.; Craig Alan Hegeman, Apex, N.C.

[73] Assignee: MCI Communication Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,153
[22] Filed: May 28, 1996
[51] Int. Cl.$^6$ .................................................... G06F 17/30
[52] U.S. Cl. ................................. 707/10; 707/5; 707/1; 707/103; 707/500; 707/526; 707/202; 455/9
[58] Field of Search ............................ 707/10, 2, 1, 202; 455/9; 364/265

[56] References Cited

U.S. PATENT DOCUMENTS

| | | | |
|---|---|---|---|
| 4,849,879 | 7/1989 | Chinnaswamy et al. | 364/200 |
| 4,979,118 | 12/1990 | Kheradpir | 364/436 |
| 5,287,505 | 2/1994 | Calvert et al. | 707/202 |
| 5,446,680 | 8/1995 | Sekiya et al. | 364/550 |
| 5,473,596 | 12/1995 | Garafola et al. | 370/13 |
| 5,488,715 | 1/1996 | Wainwright | 395/182.02 |
| 5,566,161 | 10/1996 | Hartmann et al. | 370/15 |
| 5,751,943 | 5/1998 | Benzenberg et al. | 395/183.16 |

OTHER PUBLICATIONS

Austin, G., et al. "Unlocking the value of performance monitoring data," *Telephony*, pp. 48–52, Nov. 14, 1994.

*Primary Examiner*—Anton Fetting
*Assistant Examiner*—Jean M. Corriélus

[57] ABSTRACT

A system and method for storing and retrieving performance and topology information of a telecommunications network. A network performance data parser receives network performance data messages in real time, parses the messages according to parsing rules, reformats the messages according to the parsing rules, and writes out the reformatted messages to a performance data file. A network performance data loader retrieves the reformatted messages from the performance data file and loads them into an open database management system. A topology data loader retrieves weekly network topology data from a topology data file and loads it into the open database management system. A SONET data loader retrieves daily network SONET data from a SONET data file and loads it into the open database management system. The open database is easily accessible via any SQL interface.

9 Claims, 14 Drawing Sheets

SYSTEM AND METHOD FOR STORING AND RETRIEVING PERFORMANCE AND TOPOLOGY INFORMATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates generally to telecommunication networks, and more specifically, to provide trending analysis of a telecommunications network by monitoring network performance and topology information that spans days, weeks and months.

2. Related Art

A typical telecommunication network comprises multiple telecommunication switches located throughout a geographical area. When a customer makes a call, the call may be routed through one or more switches before reaching its destination. It is imperative that the network operate reliably and efficiently to ensure high quality network services and customer satisfaction.

The monitoring and maintenance of a telecommunications network is compounded by the fact that the number of network customers is continually increasing. Current network customers are using the network in new ways including access to Internet and the Wide World Web. Additionally, networks are continually expanding into new areas to reach new customers. Therefore, the volume of data transmitted over a telecommunications network is continually increasing along with the number of required monitoring points. A monitoring point is a location in the telecommunications network at which the network is being checked in terms of transmission errors, workload, and other performance statistics. As an example of the magnitude of this problem, there were over two (2) million monitoring points in the MCI telecommunications network at the end of 1995.

When monitoring a telecommunications network's performance, the network must be considered in its entirety. It is not sufficient to monitor a network in terms of individual segments because each segment of a network impacts the others. Therefore, monitoring network performance must include identifying trend analysis and root causes.

There are certain network conditions that can only be identified by trending analysis. For example, a bad Digital Cross Connect (DXC) 3/3 card may not be causing a problem that would show up on a real-time monitoring system. The bad card, however, would show up using long term trending analysis. Monitoring the trend of network performance over time identifies systemic problems in a particular manufacturer's product or indicates procedural problems in operating the network.

Contemporary network management systems do not provide complete or adequate network performance information. Typically, a management system provides a few report formats that contain limited performance information. The management system cannot provide trending analysis of network performance information that spans days, weeks and months. Additionally, contemporary systems do not combine network performance information with topology information. Therefore, network operators cannot correlate network performance with the placement of specific network devices.

The problem with contemporary network management systems is further evident when assisting in the testing of a customer's circuits prior to "turn-up." Turn-up occurs when a circuit has been provisional and has "live" data traffic. Without the availability of trending analysis, the testing of circuits is a manual intensive process. A system operator must monitor each circuit for several days. This procedure requires the operator to enter several circuit identifiers (as many as one hundred) each day for each circuit being monitored. After the monitoring is complete, the operator determines from the generated reports whether the circuit is ready to be "turned-up" for the customer.

Contemporary network management systems also collect and store performance data in a custom, internal format. That is, the systems do not store network information in an easily accessible standard format. By using a custom, internal format, the systems require custom application programs to be written to retrieve the performance data and present it in a meaningful format.

Therefore, there is a need for a telecommunications network monitoring system that provides both trending analysis and routine analysis. The monitoring system must support near-real-time, next day, and week-to-week analysis. Furthermore, both network performance and topology information must be incorporated into the same monitoring system. Therefore, the network performance information can be correlated with the topology information.

There is a further need for a telecommunications network monitoring system that provides an open and reliable collection point for network performance and topology information. Circuit availability and the percentage of error-free seconds can be monitored, thereby fulfilling tariff obligations and predicting problems prior to tariff impact.

There is still a further need for a telecommunications network monitoring system to provide a convenient and flexible means for the storage and retrieval of network performance and topology information. Easy and rapid access to such information assists network operators in monitoring the network in its entirety, as well as, in monitoring any specific monitoring point.

SUMMARY OF THE INVENTION

The open database of the present invention solves the problems associated with contemporary network monitoring systems by providing a complete network monitoring system. The open database collects and stores network performance and topology information that spans days, weeks and months. Furthermore, the open database stores the network performance and topology information in a standard format. This allows easy access and retrieval of the information using commercial off-the-shelf software.

The open database receives three types of network information. First, network performance messages are sent in real time from multiple site controllers located throughout the telecommunications network. These messages are concentrated in a Single Local Support Element (LSE). The open database parses the performance messages as they are received from the LSE, performs any needed conversions, and translates the performance information into standard formatted records. The open database then loads the formatted records into the database management system (DBMS).

Second, the Light Terminating Equipment (LTE) and Transport Bandwidth Manager (TBM) devices send daily Synchronous Optical NETwork (SONET) messages to the DBMS. SONET messages provide performance information for the optical fiber transmissions on the public network. The open database loads these messages directly into the DBMS without the need for parsing or reformatting.

Third, the network Real Time Topology (RTT) system sends weekly topology messages to the open database. The topology messages provide information on the devices that comprise the network and on the configuration of the devices. The open database loads these messages directly into the DBMS without the need for parsing or reformatting.

The open database provides numerous advantages to network operators. Network operators have easy and rapid access to performance and topology information, thereby allowing the correlation of network performance to the network topology. Operators can directly troubleshoot specific network devices. Examples of problems that can be found using the open database include: Digital System (DS) Circuit cable problems, multiplexer high speed card replacement, and lightwave transmitter replacement. Operators can also generate performance and time-of-day analyses for customer sites.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. System Configuration

Figure 1:
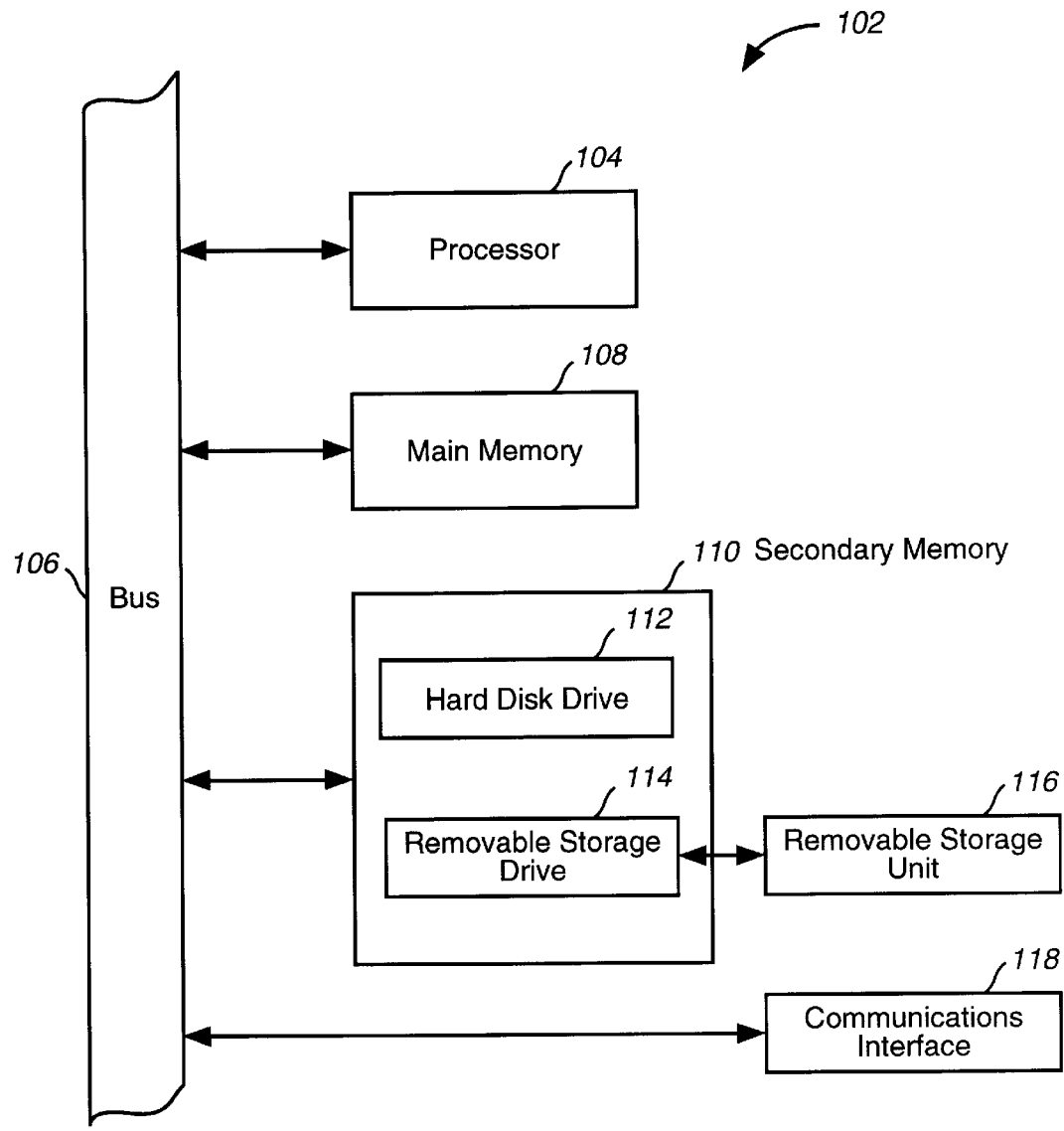
FIG. 1 is a block diagram of an exemplary computer system as used by the present invention.

The preferred embodiment of the present invention is computer software executing within a computer system. FIG. 1 shows an exemplary computer system. The computer system 102 includes one or more processors, such as a processor 104. The processor 104 is connected to a communication bus 106.

The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM, or PROM), etc. which is read by and written to by a removable storage unit 116. Removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to a removable storage unit 116 in a well known manner.

The computer system 102 may also include other similar means for allowing computer programs or other instructions to be loaded. Such means can include, for example, a communications interface 118. Communications interface 118 allows software and data to be transferred between computer system 102 and external devices. Examples of communications interface 118 can include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" is used to generally refer to removable storage unit 116, a hard disk installed in hard disk drive 112, and signals transferred via communications interface 118. These computer program products are means for providing software to a computer system 102.

In an embodiment where the invention is implemented using software, the software may be stored in main memory 108, or in a computer program product and loaded into computer system 102 using removable storage drive 114, hard disk drive 112, or communications interface 118. The software, when executed by the processor 104, causes the processor 104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to a computer system 102 comprising a Digital Alpha Server 8400 executing Digital UNIX. Furthermore, the preferred embodiment of the Digital Alpha Server 8400 includes 100 gigabytes (GB) of disk space with 512 megabytes (MB) of RAM. It should be understood, however, that the invention is not limited to this embodiment. Instead, the invention is described with reference to this computer system for convenience purpose only. Other computer systems could alternatively be used.

Additionally, the preferred embodiment of the present invention is directed to software. Preferably, the software package Sybase System II (Sybase) executes on the preferred computer system. Sybase is a relational database product that is commercially available and is accessible via an SQL interface. Pertinent aspects of Sybase are described in many publicly available documents, such as Purba, S., *Developing Client/Server Systems Using Sybase SQL Server System X*1, John Wiley & Sons, ISBN 0471153389 (1996), which is incorporated herein by reference in its entirety. It should be understood that the invention is described with reference to Sybase for convenience purpose only. Other software packages could alternatively be used.

2. Data Flow for the Open Database

Figure 2:
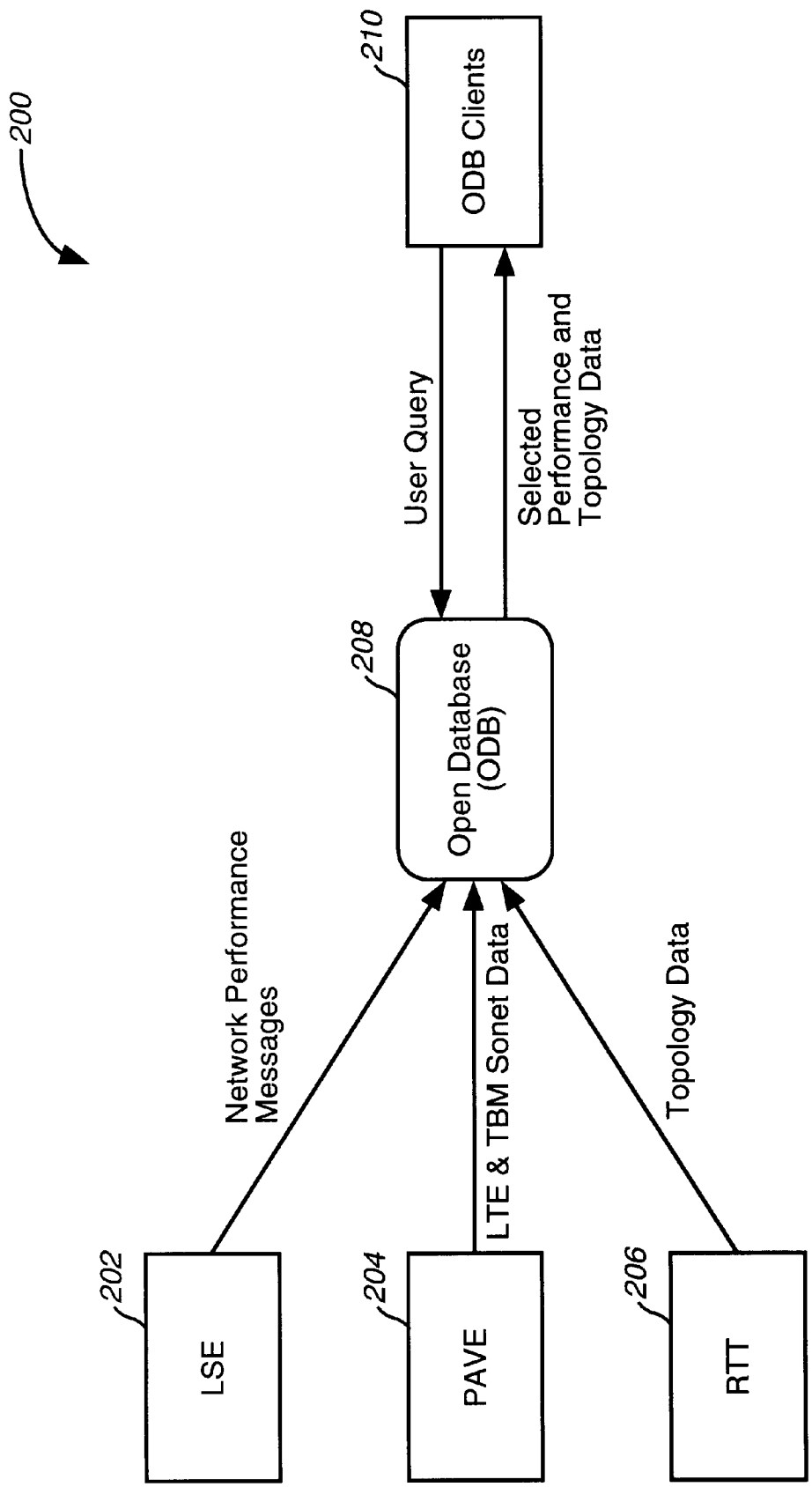
FIG. 2 is a block diagram of an open database and the environment in which it operates.

FIG. 2 is a level 0 data flow diagram illustrating the external interfaces of the open database. A data flow diagram represents how data is used among the components of a computer software application. A level 0 data flow diagram illustrates the highest level of data interfaces between a software application and external sources. Therefore, in the level 0 data flow diagram of FIG. 2, the computer software application being depicted is the open database 208 which is represented by the rounded-rectangle (or bubtangle). The LSE 202, PAVE 204, RTT 206, and ODB Clients 210 represent external sources of data that interface with the open database 208.

In a data flow diagram, the direction of an arrow connecting two objects represents the directional flow of data. For example, the Local Support Elements (LSE) 202 sends network performance messages to the open database 208. The PAVE 204 sends LTE and TBM sonet data to the open database 208. The RTT 206 sends topology data to the open database 208. The open database 208 receives and stores the network performance and topology information.

The ODB clients 210 have two data interfaces with the open database 208. First, ODB clients 210 send a user query to the open database 208 requesting for specific network performance and topology information. Second, the open database 208 returns to the ODB clients 210 the selected performance and topology data that matches the user query.

The single Local Support Element LSE) 202 receives network performance information from multiple network site controller devices. Currently, there are approximately 200–300 site controllers located throughout the United States. The LSE 202 receives the performance information and sends it to the open database 208 in real time. There are ten (10) different types of network performance messages : generation 2 performance poll message—ESFMU message, generation 2 performance poll message—CSU message, generation 2 performance nominal message, generation 2 performance poll message (crunched), generation 3 performance poll message (type 1 ESF circuit), Alcatel 1633 broadband DXC, DS3MU, E1MU, VC12, and SONET.

Example embodiments of the ten (10) network performance message formats discussed herein are further described Table 1. Table 1 is self-explanatory. The embodiments of the network performance messages of the present invention comprise complete record formats. It would be apparent to one skilled in the relevant art to develop alternative embodiments for network performance messages comprising a different number of fields and different field definitions.

The PAVE 204 receives Synchronous Optical NETwork (SONET) messages from Light Terminating Equipment (LTE) and Transport Bandwidth Manager (TBM). The SONET messages contain daily summaries pertaining to performance information on the optical fiber transmissions on the network. The PAVE 204 receives the SONET messages and sends them to the open database 208 daily. There are nine (9) different types of SONET messages:

pave_reports, sonet_ds3 _reports, sonet_ds3_detail, sonet_sts1_reports, sonet_sts1_detail, sonet_oc12_ reports, sonet_oc12_detail, sonet_oc48_reports, and sonet_oc48_detail.

Example embodiments of the nine (9) SONET message formats discussed herein are further described in Table 2. Table 2 is self-explanatory. The embodiments of the network performance messages of the present invention comprise complete record formats. It would be apparent to one skilled in the relevant art to develop alternative embodiments for network performance messages comprising a different number of fields and different field definitions.

The Real Time Topology (RTT) system 206 receives daily updates from the topology database. The topology messages provide information on the various devices that comprise the network and on the configuration of those devices. The RTT 206 receives the topology information and sends it to the open database 208 weekly. There are sixteen (16) different types of topology messages: ATT_EQUIP, CUSTOMER, CUSTOMER_CIRC, DS3_ROUTE, DXC31, DXC31_ ALT, EQUIP_TYPES, FIBER_XREF, MUX, RADIO_ DREI, RADIO_ROUTE, SEGMENT, STATION, STATION_NACS, SYS_ROUTE, and TRUNK.

Example embodiments of the sixteen (16) topology message formats discussed herein are further described in Table 3. Table 3 is self-explanatory. The embodiments of the network performance messages of the present invention comprise complete record formats. It would be apparent to one skilled in the relevant art to develop alternative embodiments for network performance messages comprising a different number of fields and different field definitions.

The ODB Clients 210 send a user query to the open database 208 requesting for specific network performance and topology information. Because the open database is implemented using a standard, relational database format, the ODB Clients 210 can access the performance and topology information using the structured query language (SQL). More specifically, the open database can be accessed and displayed using any commercial off-the-shelf software, such as Microsoft Excel, that implements SQL. Upon receiving a user query, the open database 208 returns to the ODB clients 210 the selected performance and topology data that matches the user query.

Figure 3:
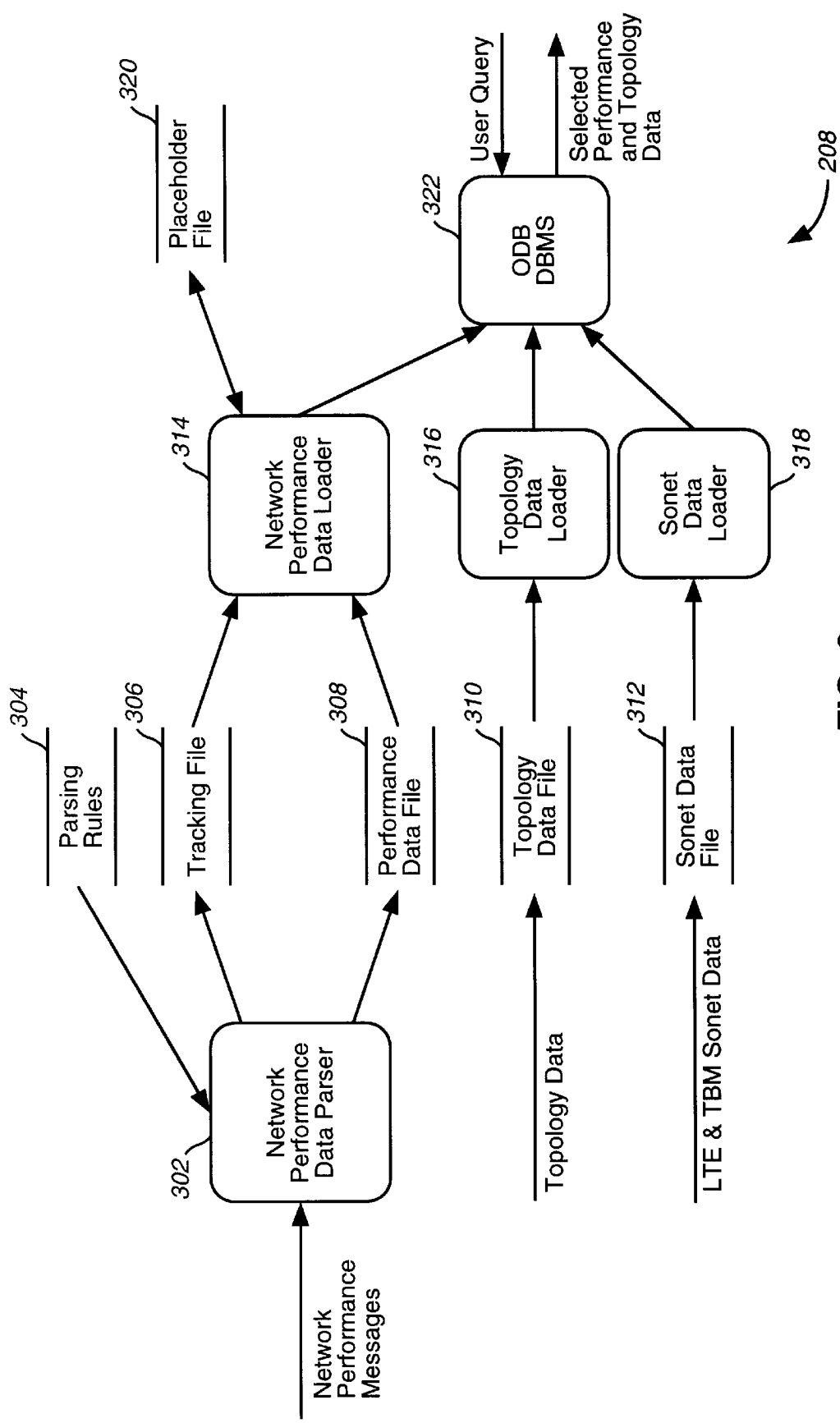
FIG. 3 is a block diagram of the internal structure of the open database.

FIG. 3 is a level 1 data flow diagram illustrating the components of the open database 210 and their relationship to the external interfaces (as shown in FIG. 2) and to each other. The components of the open database 210 include: the network performance data parser 302, network performance data loader 314, topology data loader 316, SONET data loader 318, and ODB DBMS 322.

Referring again to FIG. 2, the LSE 202 sends network performance data to the open database 208. More specifically, as shown in FIG. 3, the network performance data parser 302 establishes a TCP/IP connection with the external data source LSE 202 and acts as a server to the LSE 202. The network performance data parser 302 receives network performance messages from the LSE 202 in real time, parses the messages, and generates reformatted performance messages according to the parsing rules 304. The reformatted performance messages are stored as data records in the performance data file 308, whereas information about the performance data file 308, such as filename and file size is stored in the tracking file 306.

Example embodiments of the parsing rules discussed herein are further described in Table 4 is self-explanatory. The embodiments of the parsing rules of the present invention comprise complete record formats. It would be apparent to one skilled in the relevant art to develop alternative embodiments for the parsing rules comprising a different number of fields and different field definitions.

The network performance data parser 302 receives the network performance messages and parses them according to the parsing rules 304. The parsed messages are stored in the performance data file. There are nineteen (19) different types of parsed messages. The ESFMU messages include: monitor_cnt1, odb_sites, odb_equip_codes, esfmu_reports, esfmu_detail, esfmu_exceptions, and esfmu_cert_summary. The BBDXC messages include: bbdxc_reports, bbdxc_detail, and bbdxc_exceptions. The DS3MU messages include: ds3mu_reports, ds3mu_detail, and ds3mu_exceptions. The EIMU messages include: elmu_reports, elmu_detail, and elmu_exceptions. The OSCU messages include : ocsu_reports, oscu_detail, and oscu_exceptions.

Example embodiments of the nineteen (19) parsed message formats discussed herein are further described in Table 5. Table 5 is self-explanatory. The embodiments of the parsed messages of the present invention comprise complete record formats. It would be apparent to one skilled in the relevant art to develop alternative embodiments for parsed messages comprising a different number of fields and different field definitions.

The network performance data loader 314 reads the parsed messages from the performance data file 308 as they become available, according to the file information stored in the tracking file 306, and loads the parsed messages into the ODB database management system (DBMS) 322. The network performance data loader 314 also uses a placeholder file 320 to store information on the current position in the tracking file 306 and performance data file 308 from which it is reading. The two-headed arrow between the network performance data loader 314 and the placeholder file 320 indicates that the network performance data loader 314 reads and writes data to the placeholder file 320.

Referring again to FIG. 2, the RTT 206 sends topology data to the open database 208. More specifically, as shown in FIG. 3, the RTT 206 writes the data directly into a topology data file 310. The topology data loader 316 reads the topology data from the topology data file 310 on a weekly basis and loads it directly into the ODB DBMS 322. Because the RTT 206 writes the topology data to the topology data file 310 in a format compatible with the ODB DBMS 322, the topology data loader 316 does not have to parse or reformat the data.

Referring again to FIG. 2, the PAVE 204 sends LTE & TBM SONET data to the open database 208. More specifically, as shown in FIG. 3, the PAVE 204 writes the data directly into a SONET data file 312. The SONET data loader 318 reads the SONET data from the sonet data file 312 on a daily basis and loads it directly into the ODB DBMS 322. Because the PAVE 204 writes the SONET data to the SONET data file 310 in a format compatible with the ODB DBMS 322, the SONET data loader 318 does not have to parse or reformat the data.

Referring again to FIG. 2, the ODB clients 210 send a user query to the open database 208. More specifically, as shown in FIG. 3, the ODB DBMS 322 receives the user query. The ODB DBMS 322 is a commercially available relational database that supports the SQL interfaces as well as specialized processing. The specialized processing includes: nightly database maintenance, user views, stored client queries, etc. Upon receiving a user query, the ODB DBMS 322 accesses its data tables containing the network performance and topology data to prepare a response. The ODB DBMS 322 returns to the ODB clients 210 the selected performance and topology data.

3. Control Flow of the Network Performance Data Parser

Figure 4:
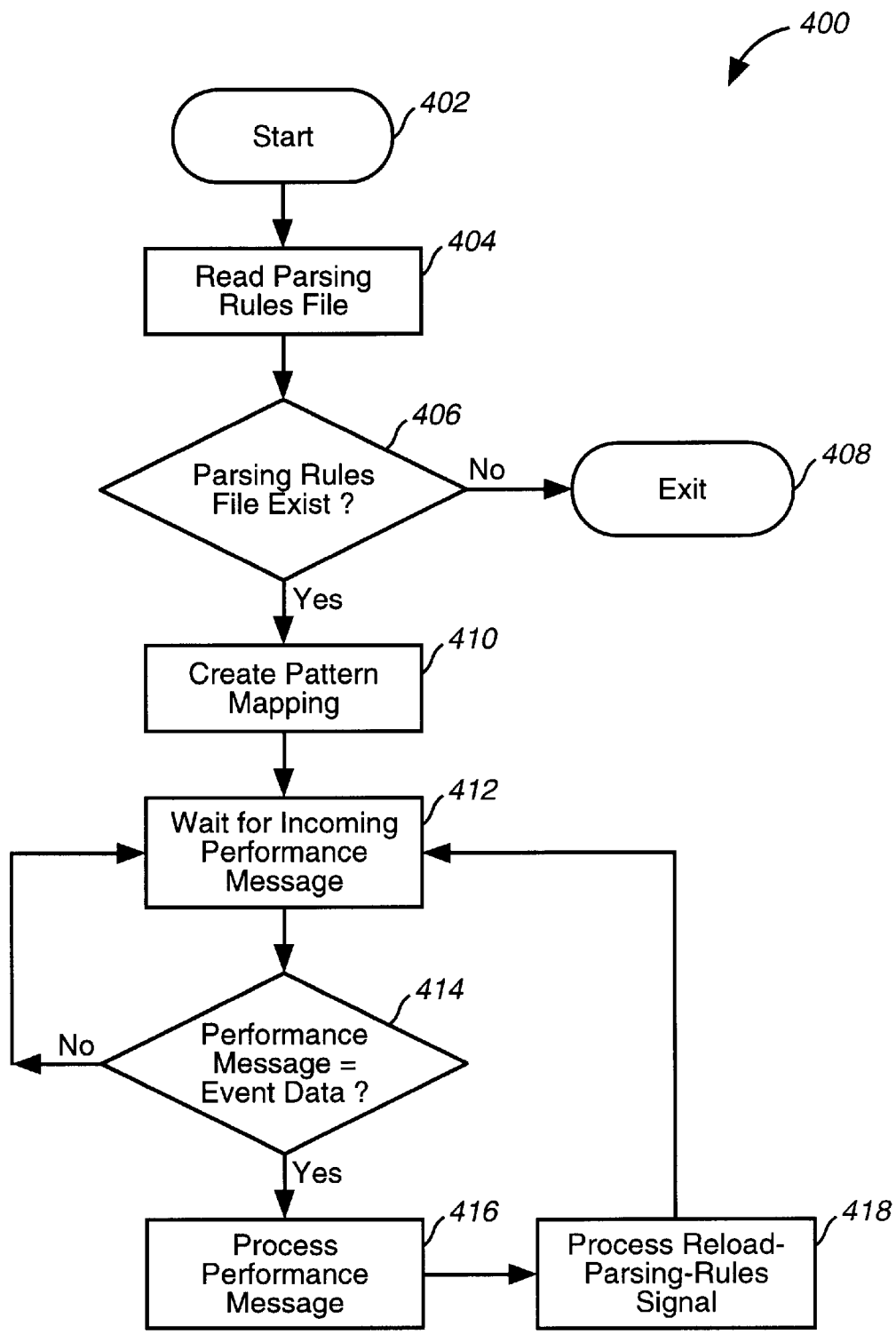
FIG. 4 is a control flow diagram representing the operation of a Network Performance Data Parser.

FIG. 4 is a control flow diagram representing the operation of the network performance data parser 302. The network performance data parser 302 begins executing at step 402 and immediately goes to step 404. In step 404, the network performance data parser 302 reads the parsing rules 304 from the parsing rules file. Continuing to step 406, the network performance data parser 302 determines whether the parsing rules file exists. If the parsing rules file does not exist, then the network performance data parser 302 proceeds to step 408 and exits.

Referring again to step 406, if it is determined that the parsing rules file exists, the network performance data parser 302 proceeds to step 410. Instep 410, the network performance data parser 302 creates a pattern mapping, according to the parsing rules 304, for each of the network performance data messages that it will receive. Continuing to step 412, the network performance data parser 302 enters an infinite loop. The network performance data parser 302 loops forever waiting for the receipt of a network performance message.

In step 412, the network performance data parser 302 waits for an incoming network performance message. Once it receives a performance message, the network performance data parser 302 proceeds to step 414. In step 414, the network performance data parser 302 determines whether the received performance message is event data. Event data is a network performance message that is detailed in the parsing rules 304. If the received performance message is not event data, the network performance data parser 302 returns to step 412 and waits for the next network performance message to arrive.

Referring again to step 414, if the received performance message is event data, the network performance data parser 302 proceeds to step 416. In step 416, the network performance data parser 302 processes the received performance message. Step 416 is described in greater detail below. After processing the message, the network performance data parser 302 continues to step 418. In step 418, the network performance data parser 302 processes the reload-parsing-rules signal. The reload-parsing-rules signal indicates whether a new parsing rules file is available for loading into the parsing rules 304. Step 418 is described in greater detail below. Continuing from step 418, the network performance data parser 302 returns to step 412 and waits for the next network performance message to arrive.

Figure 5:
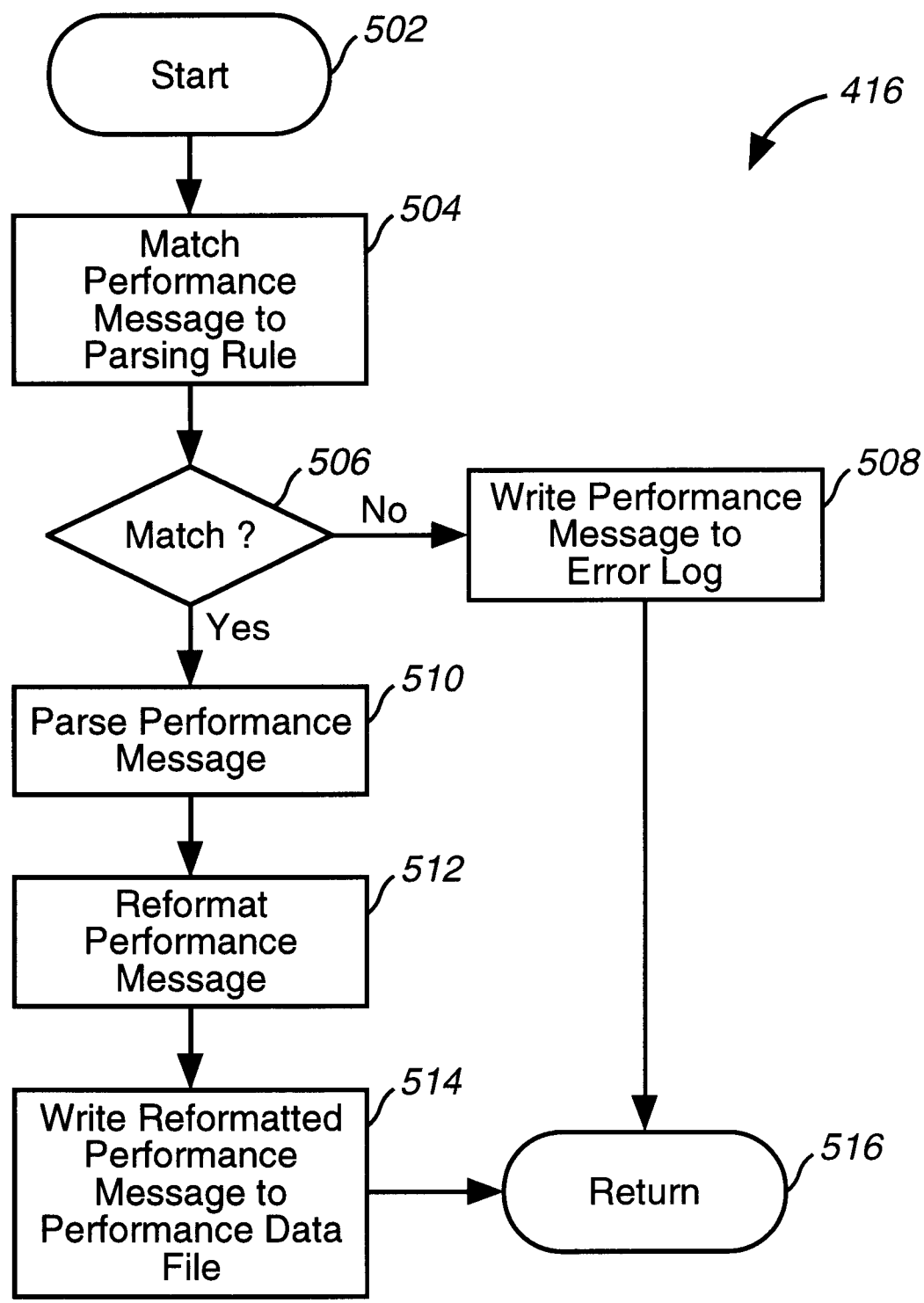
FIG. 5 is a control flow diagram representing the operation of Process Performance Message.

FIG. 5 is a control flow diagram of step 416 regarding the processing of a performance message. The network performance data parser 302 begins executing at step 502 and immediately goes to step 504 In step 504, the network performance data parser 302 matches the received performance message against the parsing rules 304. Continuing to step 506, the network performance data parser 302 determines whether a parsing rule has been found that matches the performance message. If a matching parsing rule has not been found, the network performance data parser 302 proceeds to step 508 and writes the received performance message to an error log. The network performance data parser 302 continues to step 516 and returns processing back to step 416 in FIG. 4.

Referring again to step 506, if the network performance data parser 302 determines that a matching parsing rule has been found, it proceeds to step 510. In step 510, the network performance data parser 302 parses the received performance message according to the matching parsing rule. Continuing to step 512, the network performance data parser 302 reformats the performance message into an ODB DBMS 322 reformatted message format. The network performance data parser 302 invokes one or more user functions to perform the reformatting of the performance data message.

After completing step 512, the network performance data parser 302 continues to step 514 where it writes the reformatted performance message to the performance data file 308. Step 514 is described in greater detail below. From step 514, the network performance data parser 302 continues to step 516 where it returns processing back to step 416 in FIG. 4.

Figure 6:
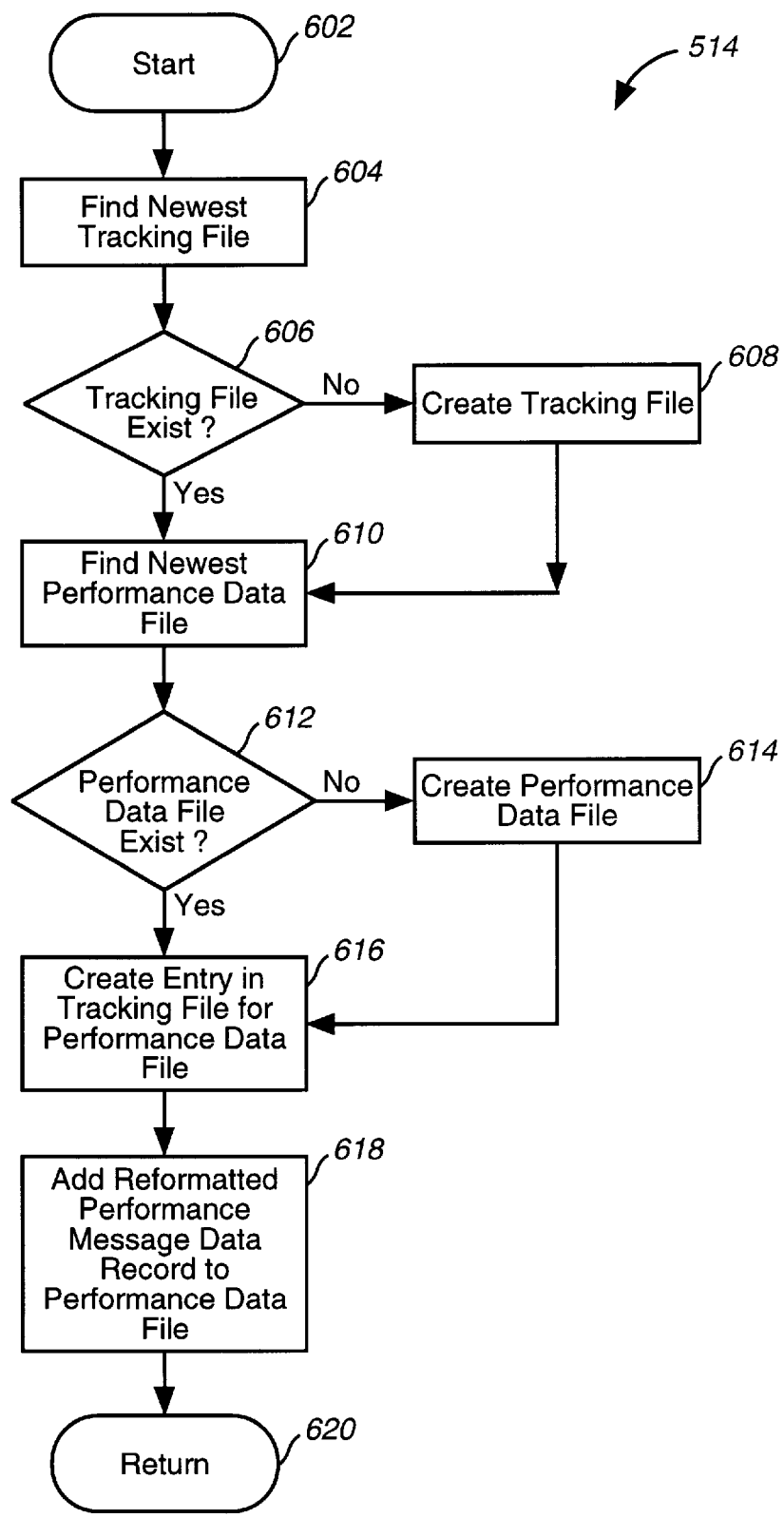
FIG. 6 is a control flow diagram representing the operation of Write Reformatted Performance Message to Performance Data File.

FIG. 6 is a control flow diagram of step 514 regarding the writing of a reformatted performance message to the performance data file 308. The network performance data parser 302 begins executing at step 602 and immediately goes to step 604. In step 604, the network performance data parser 302 finds the newest tracking file. The newest tracking file is the tracking file 306 with the most recent time/date stamp. Continuing to step 606, the network performance data parser 302 determines whether the tracking file 306 exists. If the tracking file 306 does not exist, the network performance data parser 302 proceeds to step 608. In step 608, the network performance data parser 302 creates a tracking file 306 before continuing to step 610. Referring again to step 606, if the network performance data parser 302 determines that the tracking file 306 does exist, it proceeds directly to step 610.

In step 610, the network performance data parser 302 finds the newest performance data file. The newest performance data file is the performance file 308 with the most recent time/date stamp. Continuing to step 612, the network performance data parser 302 determines whether the performance data file 308 exists. If the performance data file 308 does not exist, the network performance data parser 302 proceeds to step 614. In step 614, the network performance data parser 302 creates a performance data file 308 before continuing to step 616. Referring again to step 612, if the network performance data parser 302 determines that the performance data file 308 does exist, it proceeds directly to step 616.

In step 616, the network performance data parser 302 creates an entry in the tracking file 304 for referencing the selected performance data file 308. Continuing to step 618, the network performance data parser 302 adds the reformatted performance message data record to the performance data file 308. Step 618 is described in greater detail below. After step 618, the network performance data parser 302 continues to step 620 and returns processing to step 514 in FIG. 5.

Figure 7:
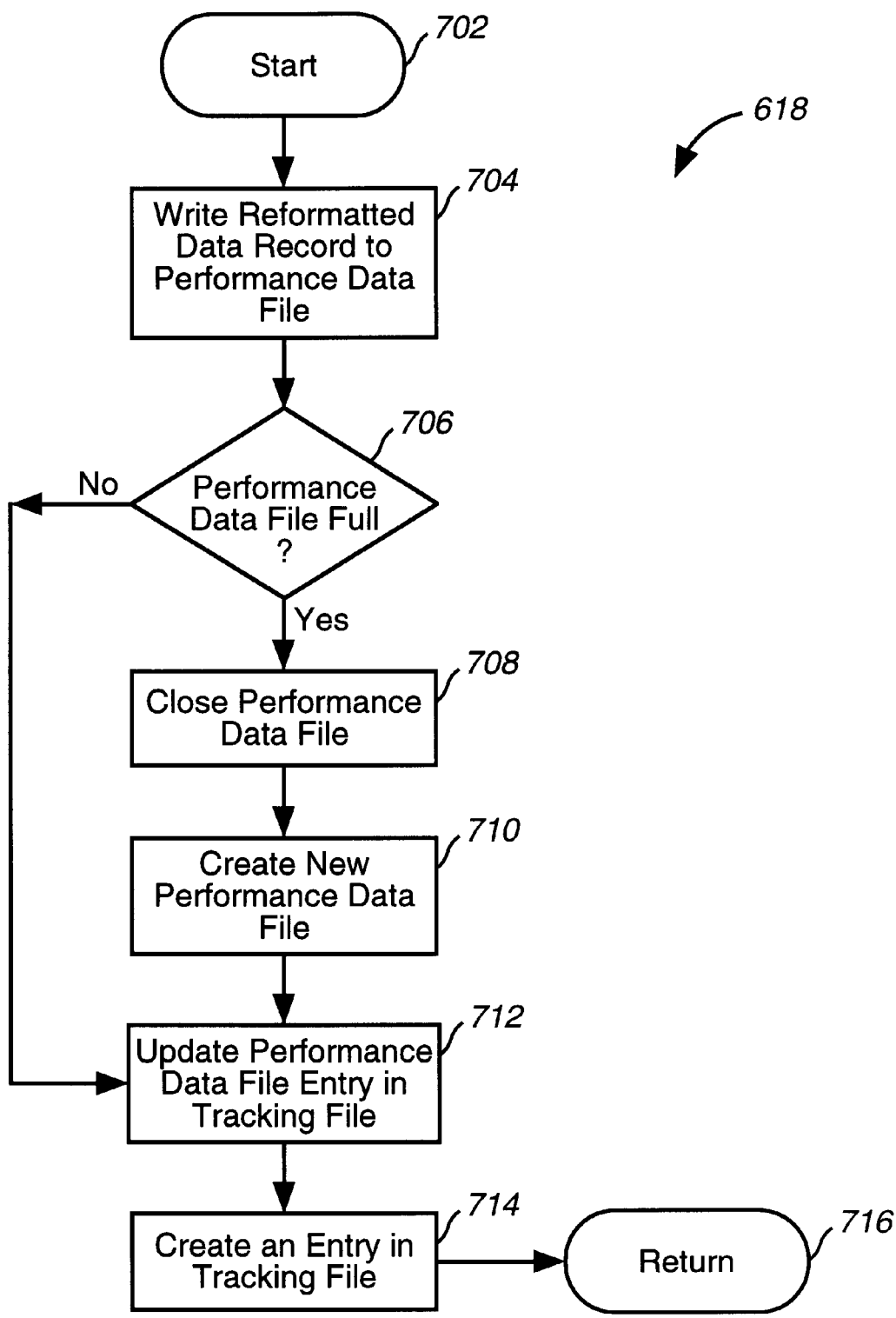
FIG. 7 is a control flow diagram representing the operation of Add Reformatted Message Data Records to Performance Data Files.

FIG. 7 is a control flow diagram of step 618 regarding the adding of a reformatted performance message data record to the performance data file 308. The network performance data parser 302 begins executing at step 702 and immediately goes to step 704. In step 704, the network performance data parser 302 writes the reformatted data record to the performance data file 308. Continuing to step 706, the network performance data parser 302 determines whether the performance data file 308 is full. If the performance data file 308 is not full, the network performance data parser 302 proceeds to step 712. Step 712 is described in greater detail below.

Referring again to step 706, if the network performance data parser 302 determines that the performance data file 308 is full, it proceeds to step 708. In step 708, the network performance data parser 302 closes the performance data file 308. Continuing to step 710, the network performance data parser 302 creates a new performance data file 308 and then goes to step 712.

In step 712, the network performance data parser 302 updates the performance data file entry in the tracking file 304 to account for the new data record. Continuing to step 714, the network performance data parser 302 creates a new entry in the tracking file 304. After step 714, the network performance data parser 302 continues to step 716 and returns processing to step 618 in FIG. 6.

Figure 8:
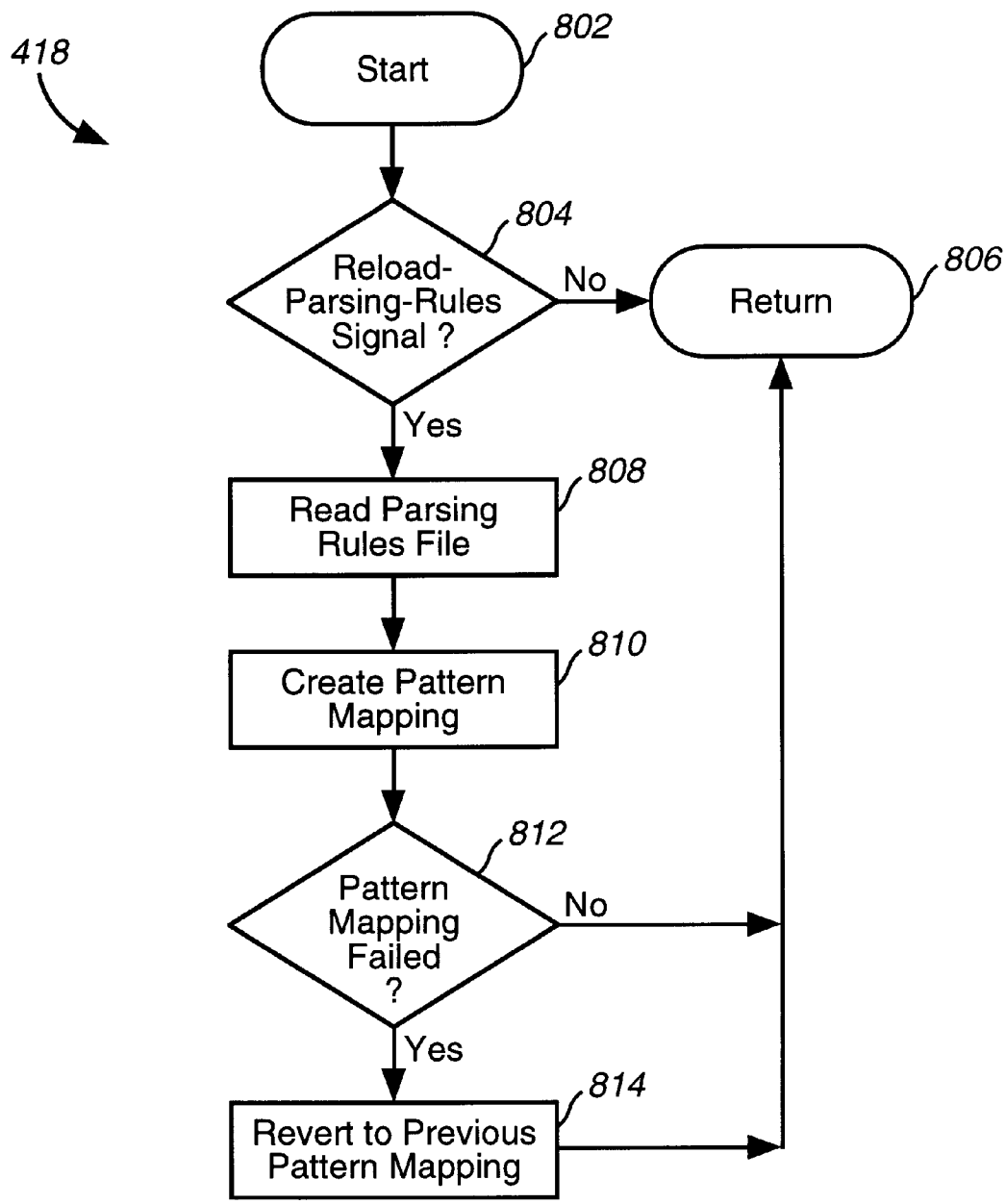
FIG. 8 is a control flow diagram representing the operation of Process Reload-Parsing-Rules Signal.

FIG. 8 is a control flow diagram of step 418 regarding the processing the reload-parsing-rules signal. The network performance data parser 302 begins executing at step 802 and immediately goes to step 804. In step 804, the network performance data parser determines whether a reload-parsing-rules signal exists. If the reload-parsing-rules signal does not exist, the network performance data parser 302 proceeds to step 806 and returns processing to step 418 in FIG. 4.

Referring again to step 804, if the network performance data parser 302 determines that the reload-parsing-rules signal exists, it proceeds to step 808. In step 808, the network performance data parser 302 reads the parsing rules from the new parsing rules file. Continuing to step 810, the network performance data parser 302 creates the pattern mapping according to the new parsing rules. The network performance data parser 302 continues to step 812 to determine whether the pattern mapping failed. For example, the pattern mapping may fail due to syntax errors or file errors. If the network performance data parser 302 determines that the pattern mapping did not fail, then it knows that the parsing rules are valid and proceeds to step 806. In step 806, the network performance data parser 302 returns processing to step 418 in FIG. 4.

Referring again to step 812, if the network performance data parser 302 determines that the pattern mapping failed, it knows that the new parsing rules are invalid and proceeds to step 814. In step 814, the network performance data parser 302 reverts to the previous parsing rules 304. Continuing to step 806, the network performance data parser 302 returns processing to step 418 in FIG. 4.

4. Control Flow of the Network Performance Data Loader

Figure 9:
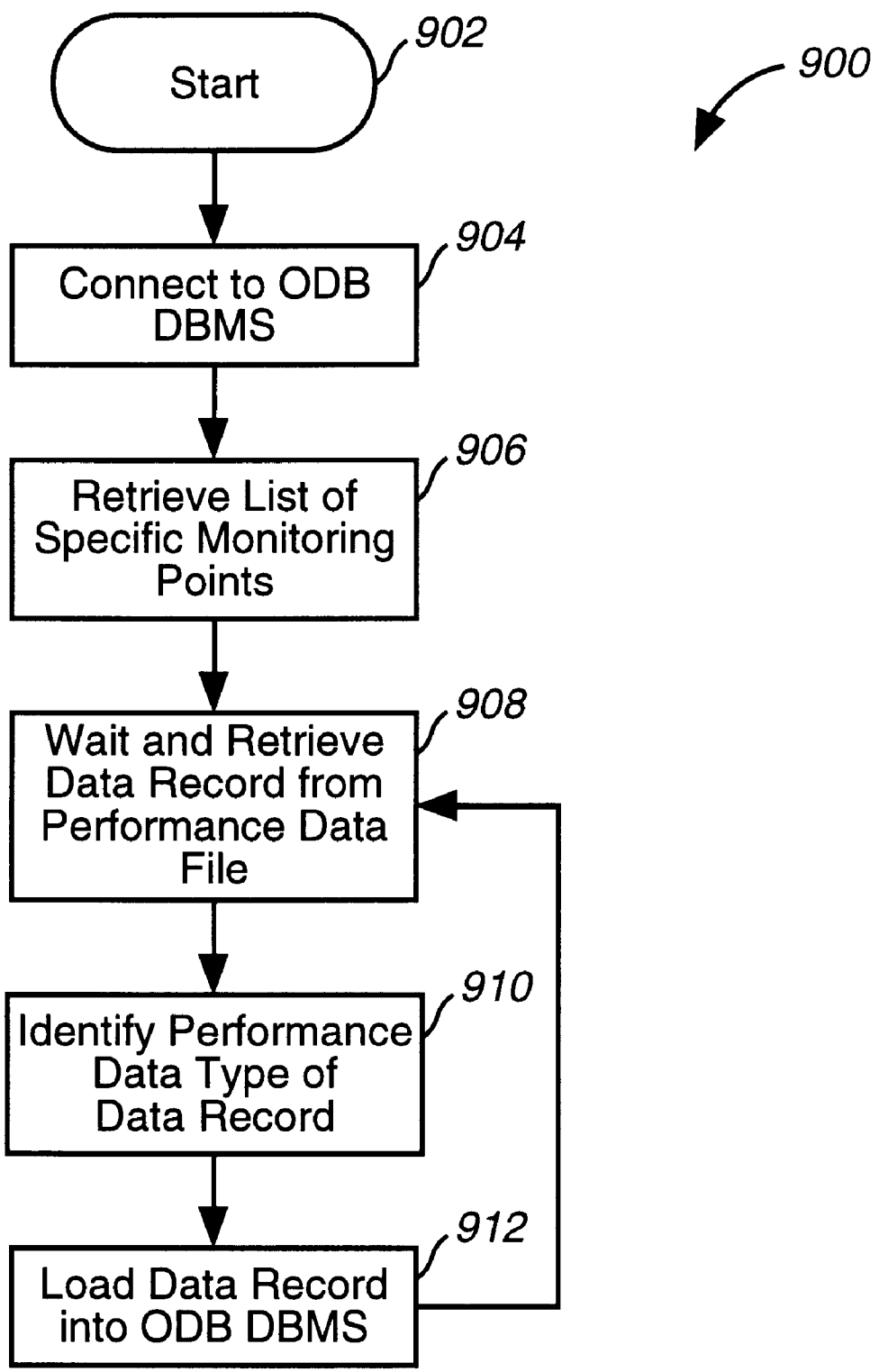
FIG. 9 is a control flow diagram representing the operation of a Network Performance Data Loader.

FIG. 9 is a control flow diagram representing the operation of a network performance data loader 314. The network performance data loader 314 begins executing at step 902 and immediately goes to step 904. In step 904, the network performance data loader 314 connects to the ODB DBMS 322. Continuing to step 906, the network performance data loader 314 retrieves the list of specific monitoring points that indicates the monitoring points of the telecommunications network from which performance messages will be sent. From step 906, the network performance data loader 314 goes to step 908 at which the network performance data loader 314 enters an infinite loop. The network performance data loader 314 continues to loop while waiting for data records to be written to the performance data file 308.

In step 908, the network performance data loader 314 waits for the network performance data parser 302 to write a data record to the performance data file 308. When the network performance data parser 302 writes a record to the performance data file 308, the network performance data loader 314 retrieves the data record. Step 908 is described in more details below.

Continuing to step 910, the network performance data loader identifies the type of data record that it retrieved from the performance data file 308. Afterwhich, the network performance data loader 314 loads the data record into the corresponding table in the ODB DBMS 322. The network performance data loader 314 returns to step 908 to wait for the network performance data parser 302 to write another data record to the performance data file 308.

Figure 10:
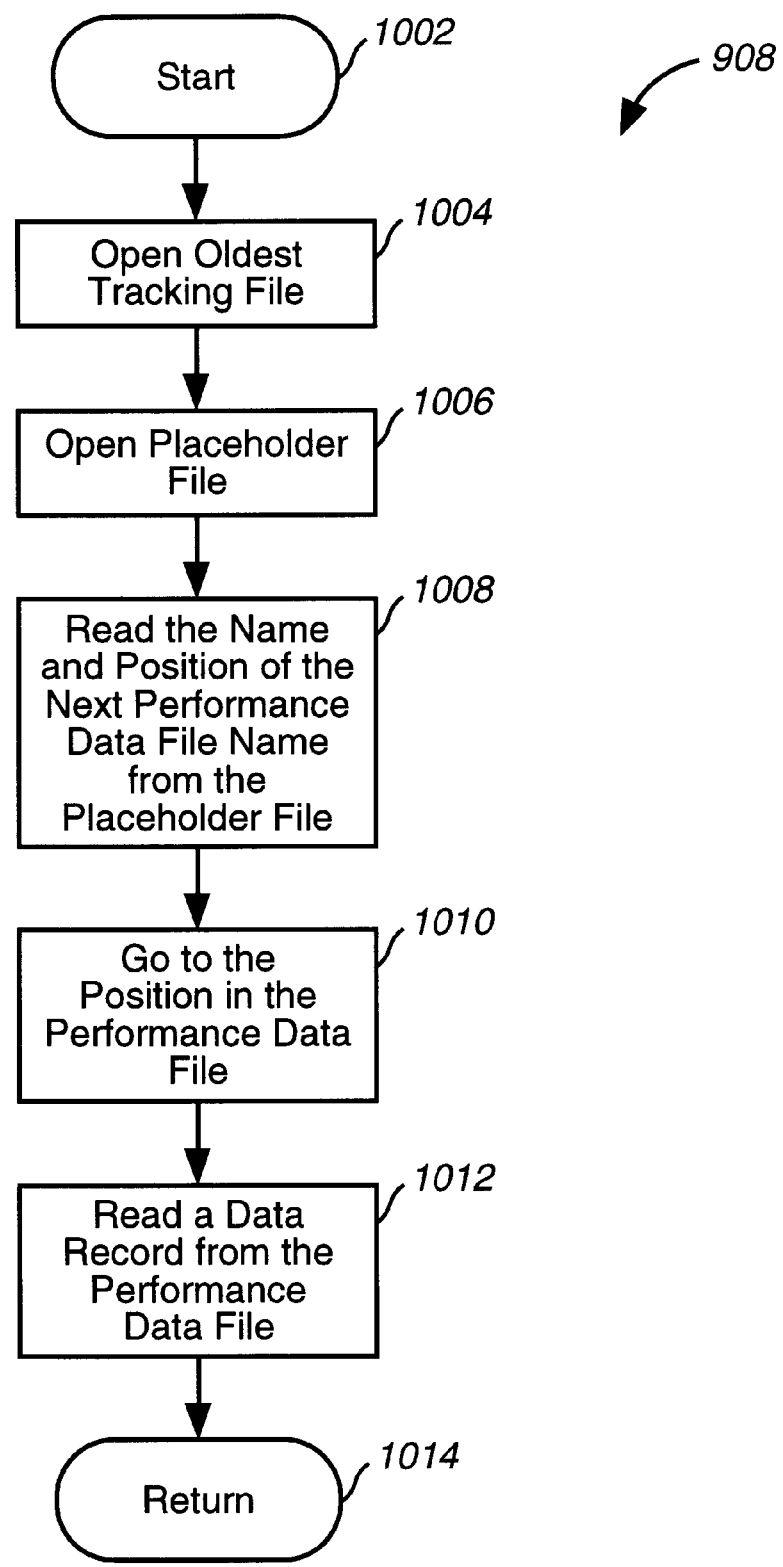
FIG. 10 is a control flow diagram representing the operation of Wait and Retrieve a Data Record from Performance Data File.

FIG. 10 is a control flow diagram representing the operation of step 908 and the process of a network performance data loader 314 waiting and retrieving a data record from the performance data file 308. The network performance data loader 314 begins executing at step 1002 and immediately goes to step 1004. In step 1004, the network performance data loader 314 opens the oldest tracking file. The oldest tracking file is the tracking file 306 having the least recent time/date stamp. Continuing to step 1006, the network performance data loader 314 next opens the placeholder file 320. After step 1006, the network performance data loader 314 continues to step 1008.

In step 1008, the network performance data loader 314 reads the name of the performance data file 320 from which it will retrieve data records and the position in that performance data file 320 at which it will begin retrieving data records. Continuing to step 1010, the network performance data loader 314 goes to the position in the performance data file 320 according to the information it read from the placeholder file 320 in step 1008. Once the network performance data loader 314 is at the correct position, the network performance data loader 314 continues to step 1012 and reads the data record from the performance data file 308 at that position. Step 1012 is described in greater detail below. Continuing to step 1014, the network performance data loader 314 returns processing to step 908 in FIG. 9.

Figure 11:
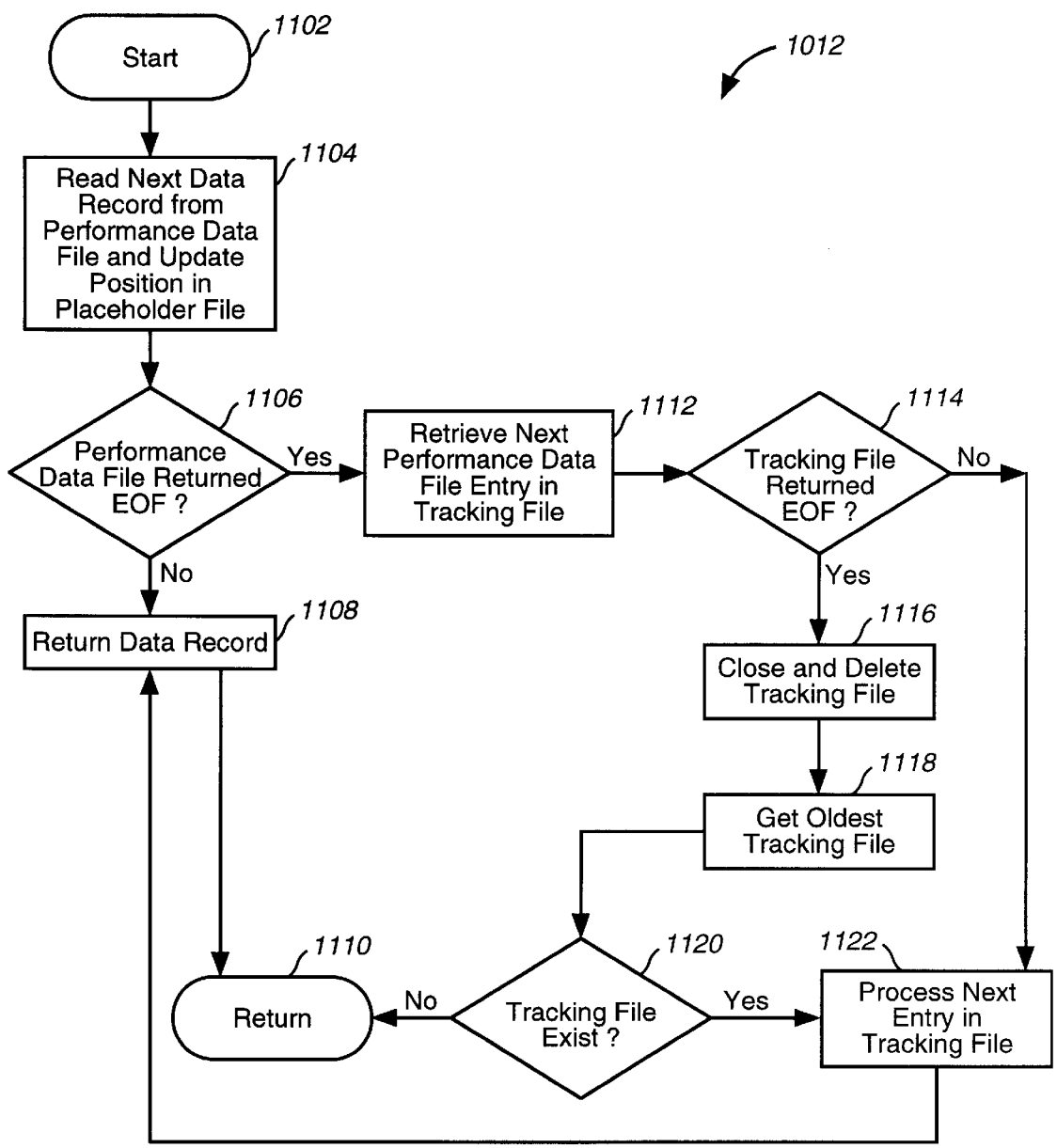
FIG. 11 is a control flow diagram representing the operation of Read a Data Record from the Performance Data File.

FIG. 11 is a control flow diagram representing the operation of step 1012 and the process of a network performance data loader 314 reading a data record from the performance data file 308. The network performance data loader 314 begins executing at step 1102 and immediately goes to step 1104. In step 1104, the network performance data loader 314 reads the next data record from the performance data file 308 and updates its current position in the placeholder file 320. Continuing from step 1104, the network performance data loader 314 enters step 1106 to determine whether the performance data file 308 returned an end-of-file (EOF).

In step 1106, if the performance data file 308 does not return an EOF, the network performance data loader 314 proceeds to step 1108. In step 1108, the network performance data loader 314 returns the data record that it had just read from the performance data file 308. Continuing to step 1110, the network performance data loader 314 returns the processing to step 1012 in FIG. 10.

Referring again to step 1106, if the performance data file 308 returns an EOF, the network performance data loader 314 proceeds to step 1112. In step 1112, the network performance data loader 314 retrieves the next performance data file entry in the tracking file 306. Continuing to step 1114, the network performance data loader 314 determines whether the tracking file returned an EOF.

In step 1114, if the tracking file 306 returns an EOF, the network performance data loader 314 proceeds to step 1116. In step 1116, the network performance data loader 314 closes and deletes the current tracking file 308 because it has completed its processing of that tracking file 308. Continuing to step 1118, the network performance data loader 314 finds the oldest tracking file. The oldest tracking file is the tracking file 306 with the least recent time/date stamp. The network performance data loader 314 continues to step 1120 where it determines whether the tracking file 306 exists.

In step 1120, if the tracking file 306 does not exist, the network performance data loader 314 proceeds to step 1110 because there are no more entries in the performance data file 308 to load into the ODB DBMS 322. In step 1110, the network performance data loader 314 returns processing to step 1012 in FIG. 10.

Referring again to step 1120, if the tracking file 306 does exist, the network performance data loader 314 proceeds to step 1122 because there are more entries in the performance data file 308 to process. In step 1122, the network performance data loader 314 processes the next entry in the tracking file 306. Step 1122 is described in greater detail below. Continuing to step 1108, the network performance data loader 314 returns the data record that it had just read from the performance data file 308 before continuing to step 1110. In step 1110, the network performance data loader 314 returns the processing to step 1012 in FIG. 10.

Referring again to step 1114, if the tracking file 306 does not return an EOF, the network performance data loader 314 proceeds to step 1122. In step 1122, the network performance data loader 314 processes the next entry in the tracking file 306. Step 1122 is described in greater detail below. Continuing to step 1108, the network performance data loader 314 returns the data record that it had just read from the performance data file 308 before continuing to step 1110. In step 1110, the network performance data loader 314 returns the processing to step 1012 in FIG. 10.

Figure 12:
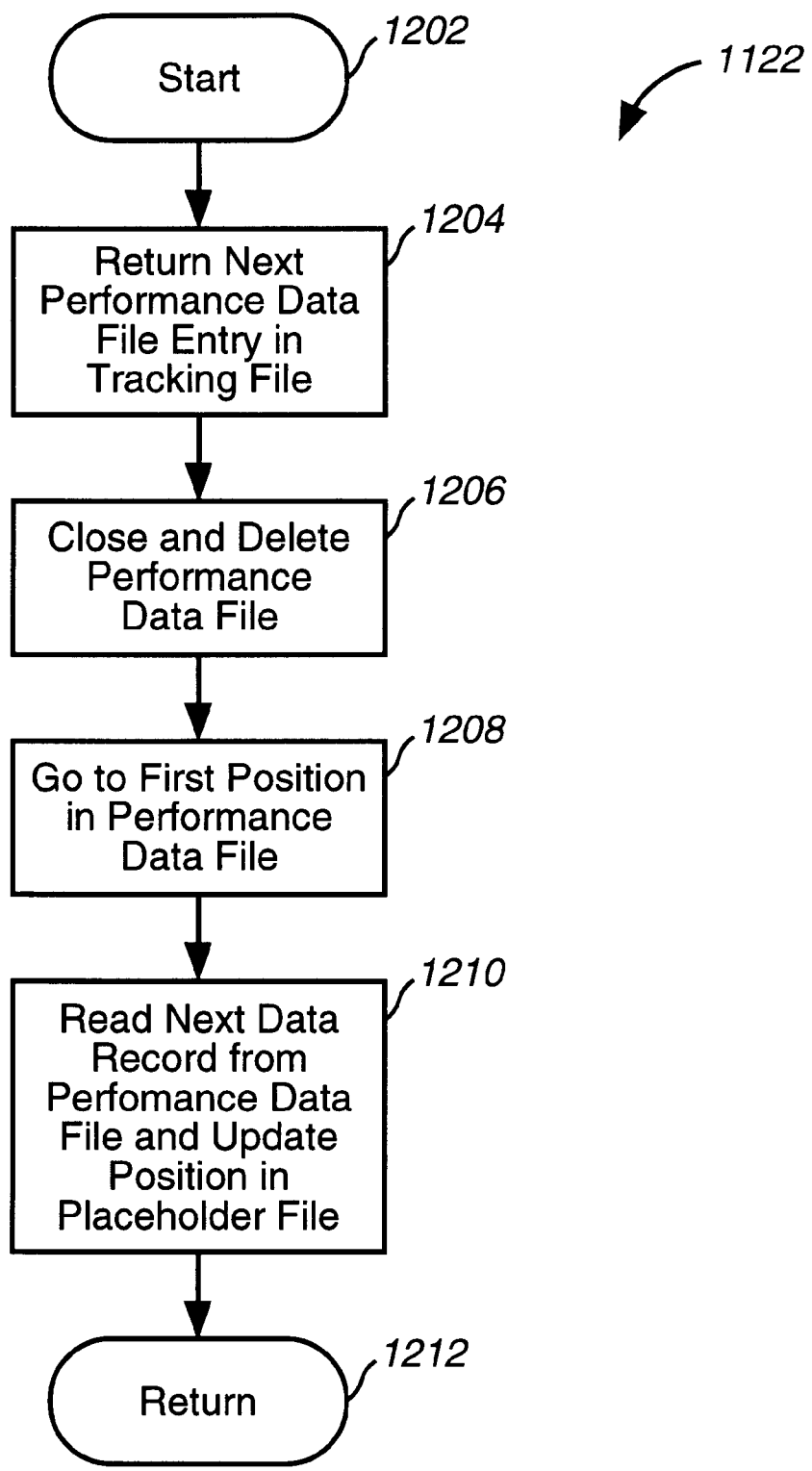
FIG. 12 is a control flow diagram representing the operation of Process Next Entry in Tracking File.

FIG. 12 is a control flow diagram representing the operation of step 1122 and the processing of a next entry in the tracking file 306. The network performance data loader 314 begins executing at step 1202 and immediately goes to step 1204. In step 1204, the network performance data loader 314 returns the next performance data file entry in the tracking file 306. Continuing to step 1206, the network performance data loader 314 closes and deletes the performance data file 308. The network performance data loader 314 has completed the processing of all of the data records stored in the performance data file 308 which is indicated by the fact that step 1106 determined that the performance data file 308 returned an EOF. Therefore, the performance data file 308 is not needed and is closed and deleted in step 1206.

Continuing to step 1208, the network performance data loader 314 goes to the first position in the performance data file 308 identified in the performance data file entry in the tracking file 306. After step 1208, the network performance data loader continues to step 1210. In step 1210, the network performance data loader reads the next data record from the performance data file 308 and updates its position in the performance data file 308 in the placeholder file 320. Continuing to step 1212, the network performance data loader returns processing to step 1122 in FIG. 11.

5. Control Flow of the Topology Data Loader

Figure 13:
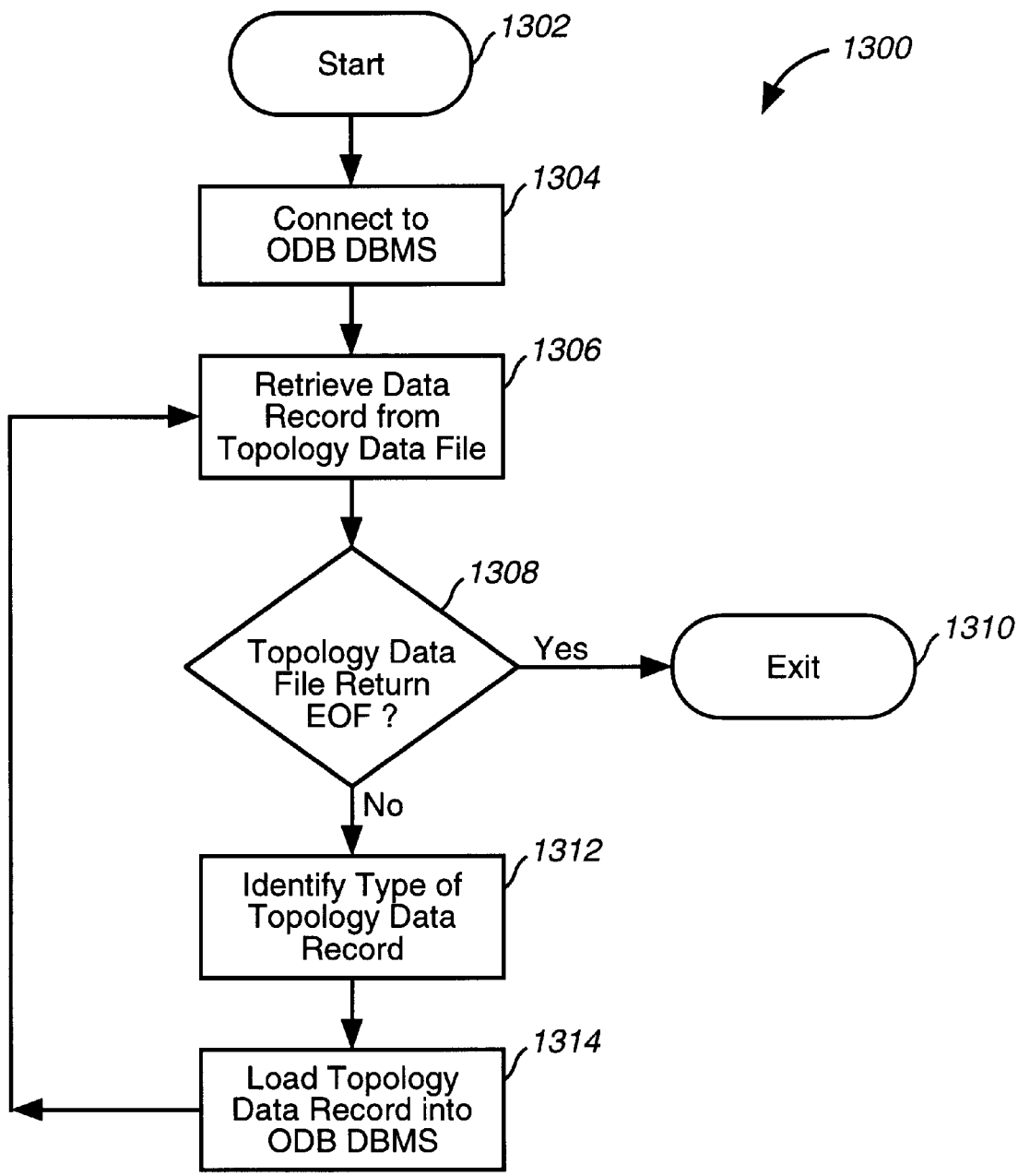
FIG. 13 is a control flow diagram representing the operation of a Topology Data Loader.

FIG. 13 is a control flow diagram representing the operation of a topology data loader 316. The topology data loader 316 begins executing at step 1302 and immediately goes to step 1304. In step 1304, the topology data loader 316 connects to the ODB DBMS 322. Continuing to step 1306, the topology data loader 316 enters a loop to retrieve and process all of the topology data records stored in the topology data file 310.

In step 1306, the topology data loader 316 retrieves a data record from the topology data file 310. Continuing to step 1308, the topology data loader 316 determines whether the topology data file 310 returned an EOF. If the topology data file 310 returned an EOF, there are no more data records to process and load into the ODB DBMS 322. Therefore, the topology data loader 316 proceeds to step 1310 and exits.

Referring again to step 1308, if the topology data file 310 does not return an EOF, the topology data loader 316 proceeds to step 1312. In step 1312, the topology data loader 316 identifies the type of topology data record that it had retrieved from the topology data file 310. Continuing to step 1314, the topology data loader 316 loads the topology data record into the ODB DBMS 322. In the preferred embodiment, the topology data loader 316 uses the Sybase utility Bulk-Copy (BCP) to load the topology data record into the ODB DBMS 322. After the topology data record has been loaded, the topology data loader 316 returns to step 1306 to retrieve another data record from the topology data file 310.

6. Control Flow of the SONET Data Loader

Figure 14:
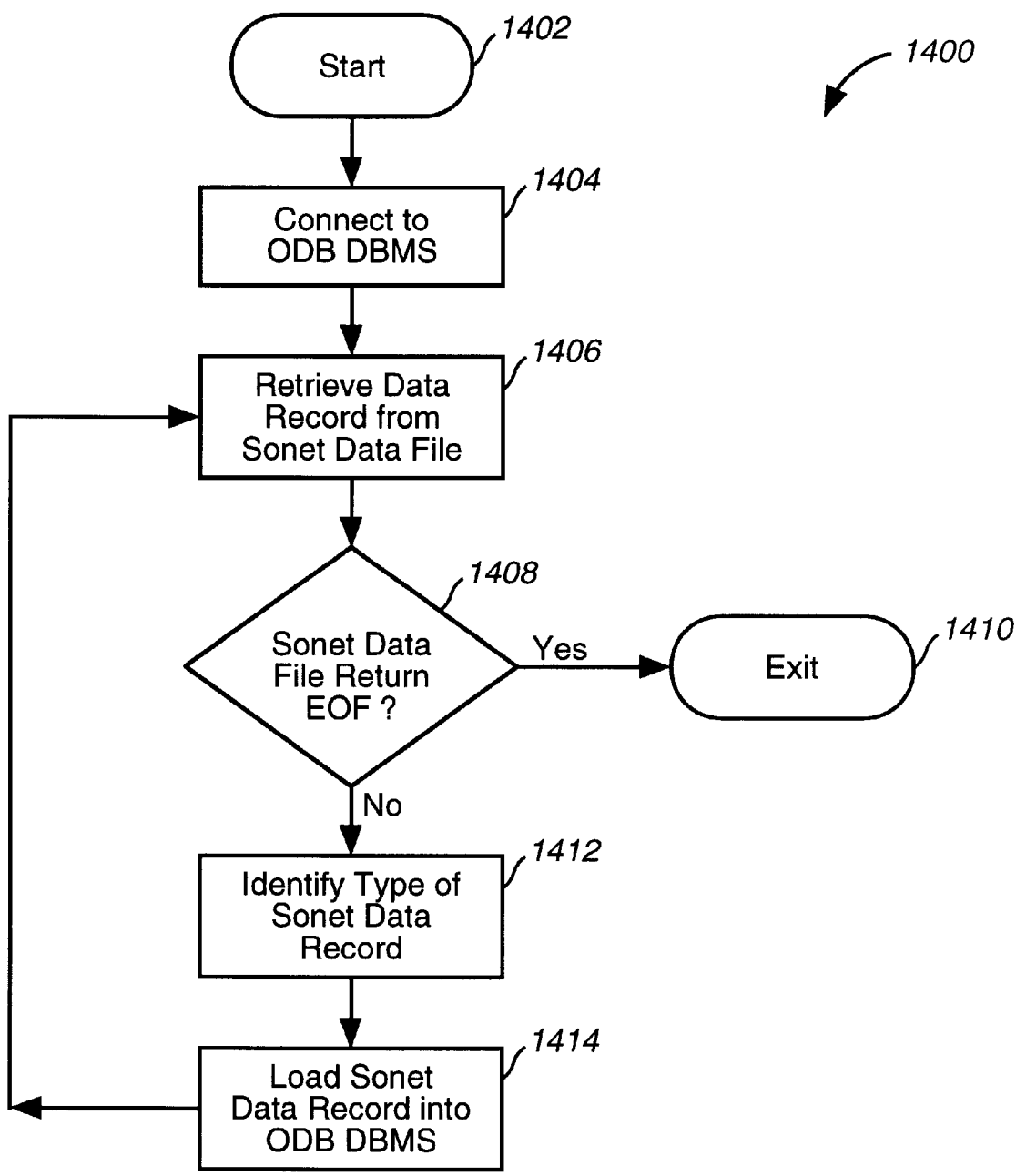
FIG. 14 is a control flow diagram representing the operation of a SONET Data Loader.

FIG. 14 is a control flow diagram representing the operation of a SONET data loader 318. The SONET data loader 318 begins executing at step 1402 and immediately goes to step 1404. In step 1404, the SONET data loader 318 connects to the ODB DBMS 322. Continuing to step 1406, the SONET data loader 318 enters a loop to retrieve and process all of the SONET data records stored in the SONET data file 312.

In step 1406, the SONET data loader 318 retrieves a data record from the SONET data file 312. Continuing to step 1408, the SONET data loader 318 determines whether the SONET data file 312 returned an EOF. If the SONET data file 312 returned an EOF, there are no more data records to process and load into the ODB DBMS 322. Therefore, the SONET data loader 318 proceeds to step 1410 and exits.

Referring again to step 1408, if the SONET data file 312 does not return an EOF, the SONET data loader 318 proceeds to step 1412. In step 1412, the SONET data loader 318 identifies the type of SONET data record that it had retrieved from the SONET data file 312. Continuing to step 1414, the SONET data loader 318 loads the SONET data record into the ODB DBMS 322. In the preferred embodiment, the SONET data loader 318 uses the Sybase utility Bulk-Copy (BCP) to load the SONET data record into the ODB DBMS 322. After the SONET data record has been loaded, the SONET data loader 318 returns to step 1406 to retrieve another data record from the SONET data file 312.

CONCLUSION

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for storing and retrieving performance and topology data of a telecommunications network, comprising;

an open database management system for storing performance and topology data;

a network performance data parser including a plurality of parsing rules to define a mapping between network performance messages and said performance data for receiving said network performance messages and parsing said network performance messages into one or more performance data files in which said network performance data parser determines whether said network performance data matches a parsing rule, operates to parse said network performance data with said parsing rule if said network performance data matches said parsing rule and there after stores said performance data, and from which said network performance data loader retrieves said performance data to load into said open database management system;

a network performance data loader operative to retrieve and load said performance data into said open database management system;

a topology data file operative to receive network real time topology data and store said topology data, and from which a topology data loader retrieves said topology data to load into said open database management system; and a SONET data file in which a SONET device stores SONET data, and from which a SONET data loader retrieves said SONET data to load into said open database management system means.

2. The system according to claim 1, further comprising one or more tracking file to store file information on said performance data files.

3. The system according to claim 1, further comprising a placeholder file to store a position in said performance data file at which said network performance data loader is currently processing said performance data file.

4. A method for storing and retrieving network performance data of a telecommunications network, comprising the steps of:

(1a) reading a network performance data message;

(1b) determining whether said network performance data message matches a parsing rule;

(1c) parsing said network performance data message according to said parsing rule, if it is determined that said network performance data message matches said parsing rule;

(1d) reformatting said network performance data message into a reformatted performance message if said network performance data message is parsed;

(1e) writing said reformatted performance message to a performance data message;

(1f) obtaining network real time topology data using a network real time data system;

(1g) loading said obtained network real time topology data into said open database management system;

(1h) receiving SONET data from a SONET device and storing said SONET data in a SONET data file; and (1i) retrieving said SONET data from said SONET data file and loading said retrieved SONET data into said open database management system.

5. The method of claim 4, wherein step (1.e) comprises:

(1.e.1) identifying a performance data file with the most recent time/date stamp;

(1.e.2) determining whether said performance data file that was identified in step (1.e.1) exists;

(1.e.3) creating said performance data file if it is determine in step (1.e.2) that said performance data file does not exist;

(1.e.4) writing said reformatted performance message to said performance data file;

(1.e.5) determining whether said performance data file is full;

(1.e.4) closing said performance data file if it is determined in step (1.e.5) that said performance data file is full; and (1.e.7) creating a new performance data file if it is determined in step (1.e.5) that said performance data file is full.

6. The method of claim 5, wherein step (1.e) further comprises:

(1.e.8) identifying a tracking file with the most recent time/date stamp;

(1.e.9) determining whether said tracking file that was identified in step (1.e.8) exists;

(1.e.10) creating said tracking file if it is determine in step (1.e.8) that said tracking file does not exist;

(1.e.11) creating an entry in said tracking file; and (1.e.12) updating said entry in said tracking file to reflect the writing of said reformatted performance message in step (1.e.4).

7. The method of claim 4, wherein step (1g) comprises:

(2.a) connecting to said open database management system;

(2.b) retrieving a list of specific monitoring points in said telecommunications network;

(2.c) retrieving a data record from a performance data file, wherein said data record contains network performance data;

(2.d) determining a performance data type of said data record; and (2.e) writing said data record to said open database management system.

8. The method of claim 7, wherein step (2.c) comprises:

(2.c.1) opening a placeholder file;

(2.c.2) reading an entry in said placeholder file that indicates said performance data file from which to read said data record;

(2.c.3) reading said data record from said performance data file;

(2.c.4) determine whether said performance data file returned an end-of-file while performing step (2.c.3);

(2.c.5) returning said data record if it is determined in step (2.c.4) that said performance data file did not return an end-of-file;

(2.c.6) closing and deleting said performance data file if it is determined in step (2.c.4) that said performance data file did return an end-of-file;

(2.c.7) determining if a second performance data file exists if it is determined in step (2.c.4) that said performance data file did return an end-of-file;

(2.c.8) returning a first data record from said second performance data file if it is determined in step (2.c.4) that said performance data file did return an end-of-file;

(2.c.9) updating said entry in said placeholder file to indicate said return of said data record from said performance data file or to indicate said return of said first data record from said second performance data file.

9. The method of claim 8, wherein step (2.c) further comprises:

(2.c.10) opening a tracking file;

(2.c.11) retrieving a name of said second performance data file from said tracking file if it is determined in step (2.c.4) that said performance data file returned an end-of-file;

(2.c.12) determining if said tracking file returns an end-of-file when retrieving said name of said second performance data file in step (2.c.11); and (2.c.13) closing and deleting said tracking file if it is determined in step (2.c.12) that said tracking file returned an end-of-file.

\* \* \* \* \*